H. GERDIEN & R. HOLM.
APPARATUS FOR MEASURING THE VELOCITY AND INCLINATION OF THE WIND.
APPLICATION FILED MAY 12, 1913.
1,077,521.
Patented Nov. 4, 1913.
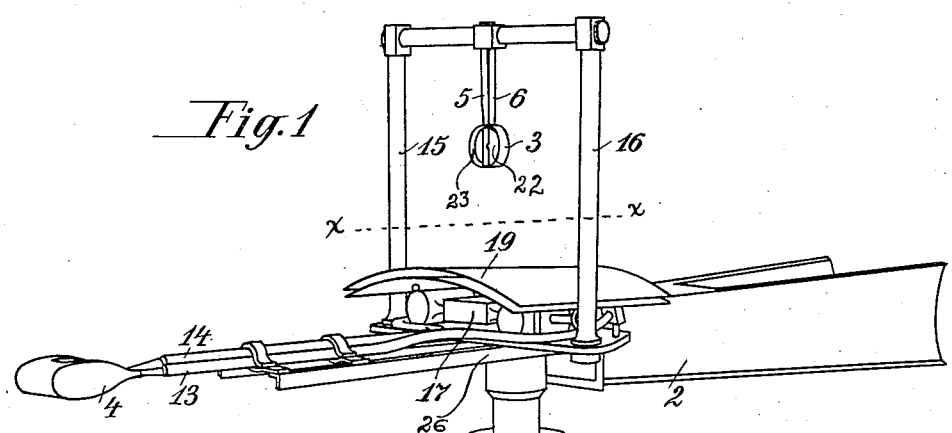
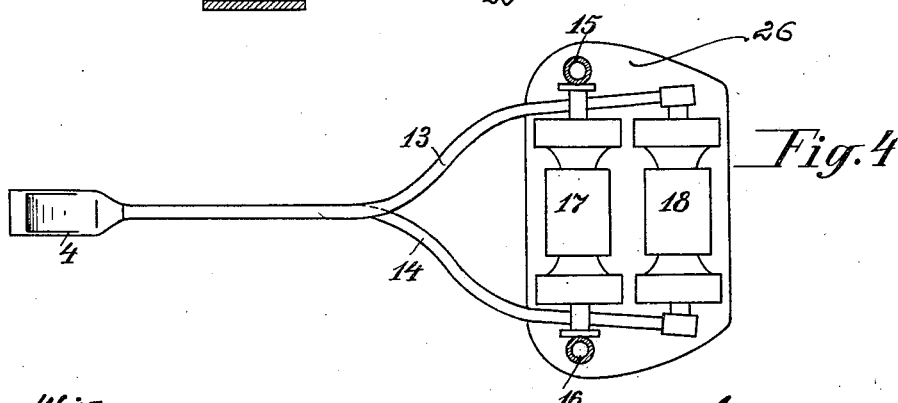

UNITED STATES PATENT OFFICE.

HANS GERDIEN, OF HALENSEE, NEAR BERLIN, AND RAGNAR HOLM, OF CHARLOTTENBURG, GERMANY, ASSIGNORS TO SIEMENS & HALSKE A. G., OF BERLIN, GERMANY, A CORPORATION OF GERMANY.

APPARATUS FOR MEASURING THE VELOCITY AND INCLINATION OF THE WIND.

1,077,521. Specification of Letters Patent. Patented Nov. 4, 1913.

Application filed May 12, 1913. Serial No. 767,206.

*To all whom it may concern:*

Be it known that we, HANS GERDIEN and RAGNAR HOLM, citizens of the German Empire and of the Kingdom of Sweden, respectively, and respectively residing at Halensee, near Berlin, and Charlottenburg, Germany, have invented certain new and useful Improvements in Apparatus for Measuring the Velocity and Inclination of the Wind, of which the following is a specification.

Our invention relates to apparatus for measuring the velocity and inclination of the wind of the type comprising a member against which the wind blows and is dammed back, the difference of pressure at the two sides of the member being a measure of the velocity of the wind.

According to our invention we employ two members or dam-bodies, one of which can adjust itself automatically about a vertical axis in the direction of the wind and whose indications are independent of the inclination and direction of the wind, while the indications of the second are dependent on the inclination of the wind. The differences of pressure at the two members are imparted in known manner to indicating instruments, for example manometers or, as in the present example, to electrical indicating instruments of known kind.

One illustrative embodiment of our invention is represented by way of example in the accompanying drawing, wherein:—

Figure 1 is a perspective view showing a preferred form of our apparatus; Fig. 2 is a vertical transverse section on an enlarged scale through the member 3 which indicates the velocity of the wind independently of the inclination and direction of the wind, Fig. 3 is a vertical section on an enlarged scale through the dam body 4 (Fig. 1) which indicates the velocity of the wind in dependence of the inclination of the wind, and Fig. 4 is a horizontal sectional view of the apparatus on the line X—X Fig. 1, the member 19 and the wind-vane 2 having been removed.

Referring to the drawing, a frame 26 which supports the several elements of the apparatus, is rotatably mounted on a column 1 and can be placed in the direction of the wind by the wind-vane 2 fastened to the frame. The one dam-body 3 is for indicating the velocity of the wind independently of its inclination and direction, and the other dam-body 4 is for indicating the velocity of the wind in dependence on the inclination of the wind. The dam-body 3 consists of a round plate 22 having wide rims 23, 23 at both sides, and pipes 5 and 6 disposed on its two surfaces as shown. These pipes have openings 7 and 8 facing plate 22, which arrangement tends to prevent impurities from entering into the pipes. A ratio of the width of the rim on each side to the diameter of the plate 22 of 1:6 has been found suitable, because inclinations of the wind are then without influence on the indications. The second dam-body 4, whose indications are dependent on the inclination of the wind, preferably has the contour of a so-called stream line. By stream line is understood that path along which the air travels when impacting on and flowing past a body without eddies being produced. The dam-body 4 is hollow and has a horizontal partition 9, dividing the body into two compartments 25, a front limiting surface 10 and the somewhat recessed guide surfaces 11 and 12. The surfaces 11 and 12 deviate somewhat, it is true, from the theoretical form of the stream line, but this has not been found injurious to the action of the apparatus. In addition, owing to surfaces 11 and 12 underlapping the front wall 10, the entering of impurities and rain particularly into the upper compartment of the dam-body is prevented. By the edges of surfaces 11 and 12 and the respective edges of surface 10, openings 24 are formed which lead into the interior of body 4, one into each compartment 25. The pipes 13 and 14 which lead to the indicating device are connected to the two compartments 25 as shown in Fig. 3.

The indicating devices used in connection with the hereindescribed apparatus are electrical measuring instruments 17 and 18 of known form, in which the air flowing through them conducts away the heat of an electrically heated wire, so that the cooling and with it the change of the electrical resistance of the wire is a measure of the velocity of the wind.

The differences of pressure at the member 3 are transmitted by the pipes 5 and 6 and the hollow columns 15 and 16 to the instrument 17, while the differences of pressure of the member 4 are transmitted by the pipes 13 and 14 to the measuring instrument 18. The indications of these instruments are transmitted electrically by conductors in the column 1 to reading or recording devices. Consequently, the described apparatus may be placed at any desired elevation in the air and only short conductors between the members 3 and 4 and the indicating instruments 17 and 18 are necessary, while the readings can be conveniently obtained at any desired place. A screen 19 is provided for protecting the indicating instruments from the rays of the sun.

When the direction of the wind is horizontal only the instrument 17 connected to the member 3 gives indications, because the wind flowing past the member 4 produces equal pressures on both sides thereof, so that the indicating instrument 18 is not influenced. When the wind comes slantingly from above, however, for example, a weaker suction action is produced at the upper opening 24 of the member 4 than at the lower. This difference of pressure is transmitted through pipes 13, 14 to the indicating instrument 18 and to the reading or recording device, and the inclination of the wind can be determined from the indications of the indicating instrument 18 when the velocity has simultaneously been ascertained from the indications of the indicating instrument 17.

We claim:—

1. In apparatus for measuring the velocity and inclination of the wind, the combination with a support, of a frame rotatable thereon, a wind-vane on the frame, a member for indicating the velocity of the wind independently of the inclination of the wind mounted on the frame, a member for indicating the velocity of the wind in dependence on the inclination of the wind carried by the frame, an indicating instrument operatively connected to the former member, and an indicating instrument operatively connected to the latter member.

2. In apparatus for measuring the velocity and inclination of the wind, the combination with a support, of a frame rotatable thereon, a wind-vane on the frame, a member having wide rims on both sides thereof for indicating the velocity of the wind independently of the inclination of the wind and mounted on the frame, a member for indicating the velocity of the wind in dependence on the inclination of the wind carried by the frame, an indicating instrument operatively connected to the former member, and an indicating instrument operatively connected to the latter member.

3. In apparatus for measuring the velocity and inclination of the wind, the combination with a support, of a frame rotatable thereon, a wind-vane on the frame, a member for indicating the velocity of the wind independently of the inclination of the wind and mounted on the frame, a member of a shape corresponding as nearly as possible to a stream line for indicating the velocity of the wind in dependence on the inclination of the wind and carried by the frame, an indicating instrument operatively connected to the former member, and an indicating instrument operatively connected to the latter member.

4. In apparatus for measuring the velocity and inclination of the wind, the combination with a column, of a frame horizontally rotatable thereon, a wind-vane on the frame, a vertical dam-body, two conduits mounted on the frame carrying the dam-body vertically above the column and opening at the two sides of the dam-body, and an indicating instrument connected to said conduits; a horizontal dam-body, two conduits carrying the latter dam-body laterally of the column and opening at the upper and lower sides of the horizontal dam-body, and an indicating instrument connected to the latter two conduits.

In testimony whereof we have signed our names to this specification in the presence of two witnesses.

HANS GERDIEN.
RAGNAR HOLM.

Witnesses:
HENRY HASPER,
WOLDEMAR HAUPT.